Dec. 19, 1950     E. L. GINZTON     2,534,437
ULTRA HIGH FREQUENCY TRANSMISSION LINE SYSTEM
Filed March 30, 1949

INVENTOR
EDWARD L. GINZTON
BY
Paul B. Hunter
ATTORNEY

Patented Dec. 19, 1950

2,534,437

UNITED STATES PATENT OFFICE 2,534,437

ULTRA HIGH FREQUENCY TRANSMISSION LINE SYSTEM

Edward L. Ginzton, Menlo Park, Calif., assignor, by mesne assignments, to The Sperry Corporation, a corporation of Delaware Application March 30, 1949, Serial No. 84,457

5 Claims. (Cl. 178—44)

This invention relates to ultra-high frequency transmission line systems and particularly to transmission arrangements in standing-wave detectors.

In conventional standing-wave detectors a slot is provided in the wall of a section of wave guide or in the outer conductor of a section of coaxial line. This slot permits a pickup device, such as a probe, to be inserted into the section of transmission line and to be moved therealong in order to measure the electromagnetic field at various positions along the section.

With such an arrangement, the sensitivity of the probe changes with changes in the capacity of the probe to its surroundings and consequently this capacity must be maintained substantially constant along the path traversed by the traveling probe.

The capacity between the probe and the walls of the slot is the largest capacity encountered. Changes in the probe-to-slot capacity as the probe is moved along the slot can be minimized by making the slot wide so that this capacity is small; however, a wide slot distorts the field in the line and allows some of the energy conveyed by the transmission line to radiate from the line. Also the ends of the slot cause reflections. Thus, conventional standing-wave detectors employ narrow slots and maintain close tolerances on the slot dimensions and probe-moving mechanism so that the variations in probe-to-slot capacity are small. Such detectors are expensive to manufacture and difficult to maintain.

A further shortcoming in conventional standing-wave detectors is that, as a result of the narrow slot, little energy is picked up by the probe unless it actually extends into the interior of the transmission line. The presence of the probe in the transmission line brings about several undesirable effects. First, the probe causes the electromagnetic field pattern to be disturbed, which in turn may result in incorrect field strength readings. Also, as the probe is moved longitudinally along the slotted line minute displacements of the vertical or tangential position of the probe cause appreciable variations in detected energy which prevent a precise determination of the longitudinal variations in field strength.

Another source of error in conventional standing-wave detectors results from current flow from one side of the slot to the other through the sliding contacts or gears of the probe carriage and the body of the probe carriage if it is constructed of conducting material. Such current flow may change the field within the transmission line and cause erratic field strength measurements.

These difficulties are over come to a considerable extent by the apparatus disclosed in copending application Serial No. 698,361, filed September 20, 1946, now Patent No. 2,496,837, granted Feb. 7, 1950. This apparatus employs a wave guide, dimensioned below cut-off at the operating frequency, coupled to a slot in the transmission line in which it is desired to measure the standing-wave ratio. The other end of the wave guide is open and supports a movable carriage to which the probe is attached. However, the slot in the transmission line and the end walls of the wave guide distort the field along the transmission line and a small error in field strength measurement results. Also, the characteristic impedance of the slotted section of the transmission line differs from the characteristic impedance of the remainder of the line, and consequently strong reflections are produced by the slotted section unless long transition sections are employed to couple each end of the slotted section to the transmission line.

The aforesaid difficulties are overcome in the present invention by providing a standing-wave detector in which a section of the transmission line is converted to a three conductor line having the same characteristic impedance as the transmission line. The separation between the two outer conductors of the three conductor line is sufficient to permit the introduction of a probe to the electromagnetic field between the conductors without adversely affecting the field.

Accordingly, it is a feature of this invention to provide an ultra-high-frequency transmission line in which a section of the line is converted into a three conductor line having the same characteristic impedance as the remainder of the line.

Another feature of this invention is to provide an improved and simplified standing-wave detector for making precise field strength measurements along a transmission line.

Another feature is to provide a standing-wave detector having a movable pickup device which is relatively insensitive to tangential displacements of the pickup device.

A further feature of the invention is to provide means in a standing-wave detector for counteracting the electromagnetic energy reflected by the detector.

A still further feature of the invention is to provide a standing-wave detector which has substantially no adverse effect upon the electromagnetic field of the transmission line.

These and other features of the invention will be apparent from the following description, the appended claims, and the drawings, in which;

Figure 1:
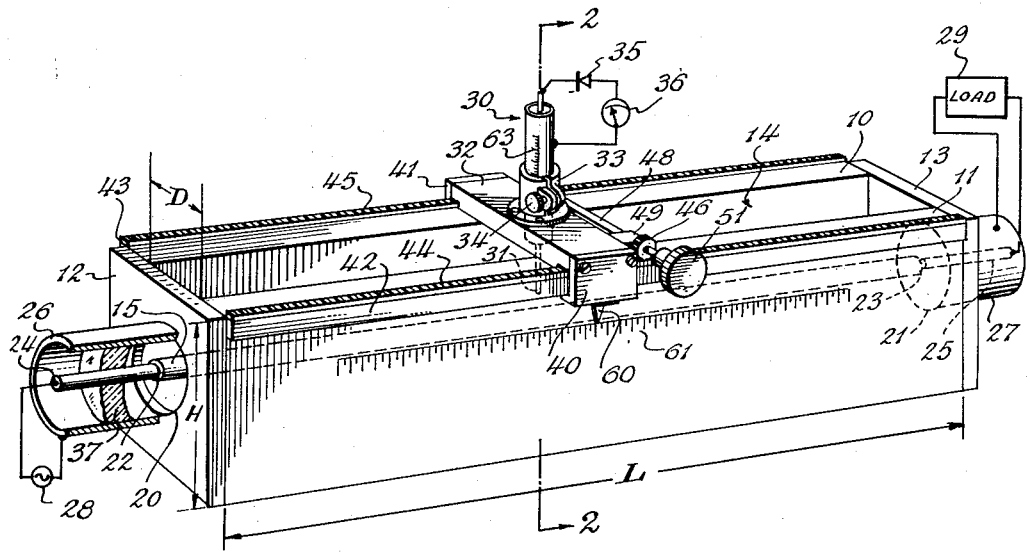
Fig. 1 is an oblique view, partially broken away, of the standing wave detector.
Figure 2:
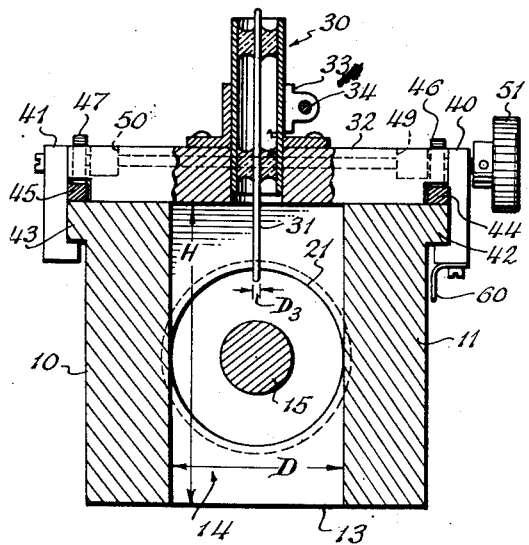
Fig. 2 is a sectional view along line 2—2 of the apparatus shown in Fig. 1.
Figure 3:
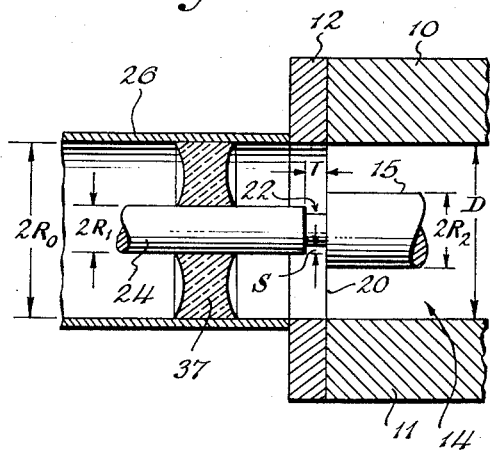
Fig. 3 is a sectional view of one end of the apparatus shown in Fig. 1.

By the conformal transforation $$Z = R_0 \tan \frac{\pi W}{2D}$$

from a Z-plane to a W-plane, the electric and magnetic field patterns in an ordinary coaxial line can be converted to the electric and magnetic field patterns between a conductor of elliptical cross-section and two infinite planes equidistant from and parallel to the major axis of the elliptical conductor $R_0$ is the inner radius of the outer conductor of the coaxial line in the Z-plane, Z represents the radius vector in the Z-plane, W represents the radius vector in the W-plane, and D is the distance between the two infinite planes.

If the characteristic impedance of the combination of the elliptical conductor and the infinite planes is to have the same characteristic impedance as the coaxial line, $$R_1 = R_0 \tan \frac{\pi W}{2D}$$

where $R_1$ is the radius vector of the inner conductor of the coaxial line in the Z-plane. For a typical coaxial line having $R_1 = 0.125$ inch and $R_0 = 0.4375$ inch, the diameters of the major and minor axes of the conductor of elliptical cross-section are 0.328 and 0.311 inch respectively for use with infinite planes separated by 0.875 inch.

It has been found that a conductor of circular cross-section can be substituted for the conductor of elliptical cross-section without materially affecting the electric and magnetic fields between the conductor and the infinite planes. The conductor of circular cross-section has a diameter approximately equal to the calculated diameter of the minor axis of a conductor of elliptical cross-section, and it is determined from the relation:

$$R_2 = \frac{2D}{\pi} \arctan \frac{R_1}{R_0}$$

where $R_2$ is the radius of the conductor of circular cross-section.

The electric and magnetic fields between the cylindrical conductor and the two planes decrease rapidly along the two planes away from the cylindrical conductor, and, in practice, the "infinite" planes can be terminated a short distance away from the cylindrical conductor. It has been found that planes having a width approximately equal to twice the spacing between the planes give satisfactory results. Very little power is radiated with such an arrangement, and hand effects are negligible.

Thus, the combination of two planes and a cylindrical conductor positioned between and spaced equidistant from the two planes may be inserted in a coaxial line without affecting the characteristic impedance of the line or the speed of propagation of electromagnetic energy along the line. This affords a convenient and practical means for examining the electric and magnetic fields along the line with very high accuracy.

The transitions from the coaxial line sections to the three-conductor transmission line comprising the two planes and the cylindrical conductor cause fringing electric and magnetic fields at each end of the three-conductor line, since the field configurations are different, and this causes a small amount of energy to be reflected along the line. Gradual tapering of one line into the other is a possible method of transforming one line into the other so as to eliminate reflections. However, this is mechanically awkward, and increases the unsupported length of the inner conductor.

A more satisfactory junction is obtained by joining the outer conductors of the two coaxial lines directly to end plates connecting the parallel planes and placing a circumferential groove in the inner conductor of each coaxial line at the junction between each inner conductor of the coaxial lines and the cylindrical conductor of the three-conductor line. The purpose of these grooves is to introduce a small inductive discontinuity at each junction, and these inductive discontinuities serve to balance out the reflections caused by the changes in field configuration at each end of the three-conductor line.

By suitable choice of the dimensions of the grooves, the characteristic impedance of the combined effect of each groove and the discontinuity adjacent thereto can be made equal to the characteristic impedance of the coaxial line sections and the effect of the discontinuity is substantially eliminated.

The proper dimensions for the groove are determined experimentally. The depth is not critical and is a function of the diameter of the cylindrical conductor of the three-conductor line.

The combined impedance contributed by the groove and the discontinuity comprises a low-pass filter having a cutoff frequency much higher than the useful frequency range of the coaxial line for structures having ordinary parameters.

Referring now to the drawings, two spaced plates 10 and 11 having adjacent surfaces which are plane and parallel are connected at each end by end plates 12 and 13 to enclose a rectangular space 14 having a length L equal to slightly more than one-half wavelength at the lowest frequency at which measurements are to be made.

A cylindrical conductor 15 extends the length of space 14 and is spaced midway between plates 10 and 11. The ends of conductor 15 are passed through circular holes 20 and 21 in end plates 12 and 13 respectively and connected through undercut sections 22 and 23 to conductors 24 and 25 which are the inner conductors of two sections of coaxial lines. The outer conductors 26 and 27 of the two coaxial line sections are attached to end plates 12 and 13 respectively. Each coaxial line section is provided with a dielectric member 37 to support the corresponding inner conductor.

Each of the two coaxial line sections 24, 26 and 25, 27 may be extended or provided with a coupling for connecting one section to a source of ultra-high-frequency electromagnetic energy 28 and the other section to a load or utilization device 29.

A third coaxial line section 30 having an inner conductor 31 which extends into space 14 is supported on a carriage 32 by clamp 33. Thumb screw 34 permits adjustment of clamp 33 so that vertical adjustment of the position of the extended inner conductor 31 with respect to conductor 15 may be effected. The portion of conductor 31 which extends below carriage 32 serves as a probe which is responsive to the electromagnetic field in space 14.

Coaxial line section 30 may be extended or provided with a coupling for connecting the section to a field strength indicator such as crystal detector 35 and meter 36. Preferably, the crystal detector should be positioned near probe 31.

Plates 10 and 11 have plane upper faces which support each end of carriage 32. Brackets 40 and 41 are attached to the ends of carriage 32 and fit over flanges 42 and 43 in plates 10 and 11 so that carriage 32 and conductor 31 can be moved longitudinally along space 14 with substantial freedom from lateral movement.

Toothed strips or racks 44 and 45 are supported on flanges 42 and 43 respectively, and each end of carriage 32 is grooved so that the carriage does not contact the toothed strips. Toothed wheels or pinions 46 and 47 are rigidly attached to shaft 48 and engage toothed strips or racks 44 and 45, respectively. Shaft 48 is rotatably supported by bushings 49 and 50 which are rigidly attached to carriage 32, and knob 51 is rigidly attached to one end of shaft 48 so that the shaft may be rotated to move carriage 32.

A pointer 60 attached to bracket 40 and a scale 61 attached to or formed in plate 11 serve as a means for determining the longitudinal position of conductor 31 in space 14.

In operation, conductor 31 is extended into space 14 a sufficient depth to cause the field strength indicator attached to coaxial line 30 to produce a suitable reading, and then successive field strength readings are observed on the indicator while probe 31 is moved longitudinally along space 14. In this manner the relative strength of the electromagnetic field in space 14 as a function of the longitudinal position of probe 31 is determined.

Since the field in the detector decreases exponentially with distance away from the center conductor, vertical movement of probe 31 provides an accurate means for attenuating the signal in coaxial line 30—the attenuation measured in decibels being linearly proportional to the vertical displacement. Thus, an alternative method of measuring the field strength along space 14 is to adjust the vertical position of coaxial line 30 and probe 31 as carriage 32 is moved longitudinally so that the reading of the indicator attached to line 30 is a constant value. The variations in field strength are then obtained by observing the vertical displacement of transmission line 30 on decibel scale 63.

More complex pickup devices may be employed if desired. For example, symmetrical magnetic probes for use with non-resonant bolometers may be substituted for probe 31.

Since fringing fields exist near each end of the standing-wave detector, field strength readings should not be made in the vicinity of end plates 12 and 13. It has been found that accurate readings can be obtained up to 6 centimeters from each end of space 14 in the embodiment of the invention disclosed herein.

Suitable dimensions for the embodiment of the invention disclosed herein are as follows:

L = slightly longer than one-half wavelength at the lowest frequency to be measured, e. g., 16.6 inches for frequencies down to 500 mc.
D = 0.875 inch
H = 1.75 inches
$R_0$ = 0.4375 inch
$R_1$ = 0.125 inch
$R_2$ = 0.156 inch
$D_3$ = 0.03 inch
S = 0.045 inch
T = 0.1 inch The only critical dimension is the distance between the probe and the inner conductor. Variations in this distance are minimized by minimizing irregularities in the surfaces of plates 10 and 11 upon which carriage 32 slides and by employing a rigid center conductor 15 firmly supported at each end. A steel rod plated first with copper and then with silver has been found satisfactory.

The apparatus is relatively insensitive to lateral variations in the position of probe 31. Lateral displacements up to 7 mm. and tilts up to 5° cause substantially no change in detected energy in the embodiment disclosed herein.

In order to minimize changes in the distance between plates 10 and 11 along space 14, the side of each plate which is not contiguous with space 14 may be provided with a reinforcing structure. For example, the plates may be cast and provided with ribs as an integral part thereof. Aluminum plates have been found satisfactory.

It will be observed that in this embodiment of the invention the distance between the parallel planes and the inner diameter of the outer conductor of the coaxial line are equal; however, these dimensions are merely illustrative and it will be apparent that different dimensions may be employed.

Since many changes could be made in the above construction and many apparently widely different embodiments of this invention could be made without departing from the scope thereof, it is intended that all the matter contained in the above description or shown in the accompanying drawings shall be interpreted as illustrative and not in a limiting sense.

What is claimed is:

1. A standing-wave detector for ultra-high frequency electromagnetic energy comprising an electrical conductor, a circumferential groove near each end of said conductor, each portion of said conductor between each groove and the respective end of the conductor having a tubular conductor substantially coextensive therewith, said tubular conductors having an inner diameter larger than the outer diameter of the end portions of said grooved conductor, means supporting each end portion of said grooved conductor coaxial with said tubular conductors, two electrically conductive plane surfaces substantially coextensive with the portion of said conductor between said grooves, said surfaces being parallel and equidistant from said grooved conductor so that the grooved conductor extends longitudinally through the center of the space between said surfaces, the longitudinal edges of said parallel surfaces providing wide longitudinal openings communicating with the space between said surfaces, means connecting each of said surfaces longitudinally between said tubular conductors, a movable electrical pickup device extending into the space between said surfaces, and means for connecting said pickup device to a field strength indicator.

2. A standing-wave detector for ultra-high-frequency electromagnetic energy comprising four surfaces of electrically conductive material defining a space of substantially rectangular longitudinal cross-section, an electrical conductor extending longitudinally through said space, said conductor extending through a hole in each end surface defining said rectangular space and being electrically insulated from said end surfaces, means for coupling an electromagnetic energy conveyor to each end of said conductor and the end surface adjacent thereto, a movable electrical pickup device extending into said rectangular space, and means for connecting said pickup device to a field strength indicator.

3. An ultra-high-frequency transmission line for electromagnetic energy comprising two coaxial line sections having substantially the same cross-sectional dimensions, two mutually spaced electrically conductive members having opposed surfaces, means connecting each of said members between the outer conductors of said coaxial line sections, and an electrical conductor connected between the inner conductors of said coaxial line sections and extending longitudinally between said surfaces, wherein said electrical conductor has a substantially circular cross-section having a radius determined by the relation $$R_2 = \frac{2D}{\pi} \arctan \frac{R_1}{R_0}$$

where $R_2$ is the radius of said electrical conductor, $R_1$ is the radius of the inner conductor of said coaxial line sections, D is the spacing between the two members having opposed surfaces, and $R_0$ is the inner radius of the outer conductors of said coaxial line sections.

4. An ultra-high-frequency transmission line for electromagnetic energy comprising two coaxial line sections having substantially the same cross-sectional dimensions, two mutually spaced electrically conductive members having opposed surfaces, means connecting each of said members between the outer conductors of said coaxial line sections, and an electrical conductor connected between the inner conductors of said coaxial line sections and extending longitudinally between said surfaces, wherein the spacing between said two members having opposed surfaces is determined generally by the conformal transformation of one of the coaxial line sections in a Z-plane which is at right angles to the length of the coaxial line section to a transformed line in a W-plane which is at right angles to the length of the transformed line, which is expressed by the equation $$Z = R_0 \tan \frac{\pi W}{2D}$$

where Z is the radius vector in the Z-plane from the center of said one coaxial line section to the surfaces constituting the coaxial line, W is the radius vector in the W-plane from the center of the transformed line to the surfaces constituting the transformed line, D is the spacing between the two members having opposed surfaces, and $R_0$ is the inner radius of the outer conductor of said one coaxial line section in the Z-plane.

5. A transmission line for ultra-high-frequency electromagnetic energy comprising an electrical conductor, first and second tubular conductors respectively surrounding the two end portions of said electrical conductor, said tubular conductors having an inner diameter larger than the outer diameter of the end portions of said electrical conductor, means supporting each end portion of said electrical conductor coaxial with said tubular conductors, two electrically conductive plane surfaces substantially coextensive with the portion of said electrical conductor between said tubular conductors, said surfaces being parallel and equidistant from said electrical conductor and the longitudinal edges thereof providing wide longitudinal openings communicating with the space between said surfaces, means connecting each of said surfaces longitudinally between said tubular conductors, a movable electrical pickup device extending into the space between said surfaces, and means for connecting said pickup device to a field strength indicator.

EDWARD L. GINZTON.

REFERENCES CITED

The following references are of record in the file of this patent:

UNITED STATES PATENTS

| Number | Name | Date |
| --- | --- | --- |
| 2,203,481 | Zottu | June 4, 1940 |
| 2,404,797 | Hansen | July 30, 1946 |
| 2,415,151 | Malling | Feb. 4, 1947 |
| 2,437,482 | Salisbury | Mar. 9, 1948 |
| 2,454,042 | Dettinger | Nov. 16, 1948 |
| 2,468,151 | Willoughby | Apr. 26, 1949 |
| 2,483,419 | Karmin | Oct. 4, 1949 |

OTHER REFERENCES

Microwave Transmission Design Data, published by Sperry Gyroscope Company, Inc., Pub. No. 23-80. Copy in Patent Office Library, dated January 23, 1946.